US009711965B2

(12) United States Patent
Geske et al.

(10) Patent No.: US 9,711,965 B2
(45) Date of Patent: Jul. 18, 2017

(54) CIRCUIT ARRANGEMENT FOR CONNECTION TO AN ELECTRICAL CIRCUIT AND ELECTRICAL CIRCUIT

(71) Applicant: GE Energy Power Conversion GmbH, Berlin (DE)

(72) Inventors: Martin Geske, Potsdam (DE); Roland Jakob, Berlin (DE)

(73) Assignee: GE ENERGY POWER CONVERSION GMBH, Berlin (DE)

( * ) Notice: Subject to any disclaimer, the term of this patent is extended or adjusted under 35 U.S.C. 154(b) by 493 days.

(21) Appl. No.: 14/025,966

(22) Filed: Sep. 13, 2013

(65) Prior Publication Data

US 2014/0077622 A1 Mar. 20, 2014

(30) Foreign Application Priority Data

Sep. 14, 2012 (DE) .................... 10 2012 216 368

(51) Int. Cl.
*H02J 4/00* (2006.01)
*H02M 1/32* (2007.01)
*H02M 1/36* (2007.01)
*H02M 5/458* (2006.01)

(52) U.S. Cl.
CPC ............... *H02J 4/00* (2013.01); *H02M 1/32* (2013.01); *H02M 1/36* (2013.01); *H02M 5/458* (2013.01); *Y10T 307/747* (2015.04)

(58) Field of Classification Search
CPC .. H02J 4/00; H02M 1/32; H02M 1/36; H02M 5/458; Y10T 307/747

USPC .......................................................... 307/113
See application file for complete search history.

(56) References Cited

U.S. PATENT DOCUMENTS

| 3,999,078 | A | * | 12/1976 | Udvardi-Lakos | ...... H01H 9/548 |
| | | | | | 307/66 |
| 5,748,423 | A | | 5/1998 | Hennchen | |
| 2007/0177319 | A1 | * | 8/2007 | Hirst | ........................ H02J 3/06 |
| | | | | | 361/85 |
| 2010/0213921 | A1 | | 8/2010 | Abolhassani | |
| 2011/0013441 | A1 | | 1/2011 | Gruber | |

FOREIGN PATENT DOCUMENTS

| CN | 1912642 A | 2/2007 |
| CN | 102790517 A | 11/2012 |
| DE | 10146868 | 4/2003 |
| DE | 102007042246 | 5/2009 |

(Continued)

OTHER PUBLICATIONS

EP Search Report issued in connection with corresponding EP Patent Application No. 13184032.4 dated on Jan. 2, 2014.

(Continued)

*Primary Examiner* — Rexford Barnie
*Assistant Examiner* — Toan Vu
(74) *Attorney, Agent, or Firm* — GE Global Patent Operation; Scott R. Stanley

(57) ABSTRACT

A circuit arrangement connected to an electrical circuit including a transformer with primary winding connected to the electric power grid and secondary winding connected to a power converter with a capacitor, the circuit arrangement has a primary winding coupled to the auxiliary winding, which is connected to a switching device.

18 Claims, 2 Drawing Sheets

(56) References Cited

FOREIGN PATENT DOCUMENTS

DE        102009033515        1/2011

OTHER PUBLICATIONS

Translated German Office Action for corresponding DE Application No. 10 2012216368.9, dated Jul. 17, 2013.
Unofficial English Translation of Chinese Office Action issued in connection with corresponding CN Application No. 201310417029.5 on Mar. 29, 2017.

* cited by examiner

CIRCUIT ARRANGEMENT FOR CONNECTION TO AN ELECTRICAL CIRCUIT AND ELECTRICAL CIRCUIT

BACKGROUND OF THE INVENTION

Embodiments of the present invention relate to a circuit arrangement for connection to an electrical circuit and an electrical circuit.

According to DE 101 46 868, for example, a circuit arrangement is known which is intended to charge a converter connected to a capacitor. The known circuit arrangement includes one semiconductor switch 20 for each converter phase, which is connected to one of the phase-related current converter valves in series.

According to DE 10 2007 042 246 A1, for example, a circuit arrangement is known which is connected to an electronic energy converter and which is intended to protect the electronic energy converter against overloading. The known circuit arrangement comprises a so-called Crowbar 28, which is activatable and non-activatable by means of a thyristor and which can be used to influence the voltage of the power converter.

BRIEF DESCRIPTION OF THE INVENTION

Embodiments of the present invention improve the known circuit arrangements.

Embodiments of the present invention provide a circuit arrangement and an electrical circuit.

In an embodiment of the present invention, the electrical circuit includes a transformer with primary winding connected to the electric power grid and secondary winding connected to a power converter with a capacitor. The circuit arrangement connected to the electrical circuit has auxiliary winding which is coupled with the primary winding and which is connected to a switching device.

In contrast to the existing publications regarding the prior state of art described above, an auxiliary winding coupled to the primary winding of the transformer exists according to an embodiment of the invention. The circuit arrangement according to an embodiment of the invention is, however, connected to the electrical circuit via the auxiliary winding. The existing semiconductor switch or thyristor mentioned in the publications above is then connected to this auxiliary winding according to an embodiment of the invention.

An advantage of the circuit arrangement according to an embodiment of the invention is its high flexibility in terms of the execution of required functions. This is due to the connection of the switching device via the auxiliary winding. This connection to the electrical circuit makes it possible to use the circuit arrangement according to an embodiment of the invention in a simple manner for one single specific function or for several different functions.

The circuit arrangement according to an embodiment of the invention has the further advantage that, due to the auxiliary winding, the switching device can be operated at a lower voltage level than without the auxiliary winding. The electrical components of the switching device according to an embodiment of the invention therefore require a lower dielectric strength and can consequently be configured more simply and at a lower cost.

In an embodiment of the invention, the switching device is constructed in such a way that it can short-circuit the phases of the auxiliary winding. In this way, a so-called short-circuiting function can be realized for the switching device according to an embodiment of the invention.

In an embodiment of the invention, the switching device is designed in such a way that it can charge the capacitor. In this way, a so-called pre-charging and charging function can be realized for the switching device according to an embodiment of the invention.

In an embodiment of the invention, the switching device is designed in such that it can short-circuit the phases of the auxiliary winding or charge the capacitor. In this case, a short-circuiting function for the power converter or a pre-charging function for the capacitor can therefore be realized for the switching device according to an embodiment of the invention. Two functions can therefore be achieved with one and the same switching device in an advantageous way. This results in substantial savings for electrical components.

More particularly, the switching device should have at least two anti-parallel connected thyristors. The switching device according to an embodiment of the invention can therefore be realized at a low cost.

In an embodiment, the circuit arrangement has at least one switch which is connected to the switching device in such a way that it short-circuits two phases of the auxiliary winding when it is deactivated. This is a particularly simple way to realize the short-circuiting function.

When this switch is activated, the auxiliary winding can then be connected to an auxiliary supply. In this way, the pre-charging function can be realized.

BRIEF DESCRIPTION OF THE DRAWINGS

Further features, possible applications and advantages of embodiments of the invention are provided in the following description of application examples for embodiments of the invention, which are illustrated in the accompanying figures. All described or depicted features, either individually or in any desired combination, thereby form the object of an embodiment of the invention, irrespective of their composition in the patent claims or their retroactive application and irrespective of their formulation or depiction in the description or in the figures. Wherein:

DETAILED DESCRIPTION OF THE INVENTION

Figure 1:
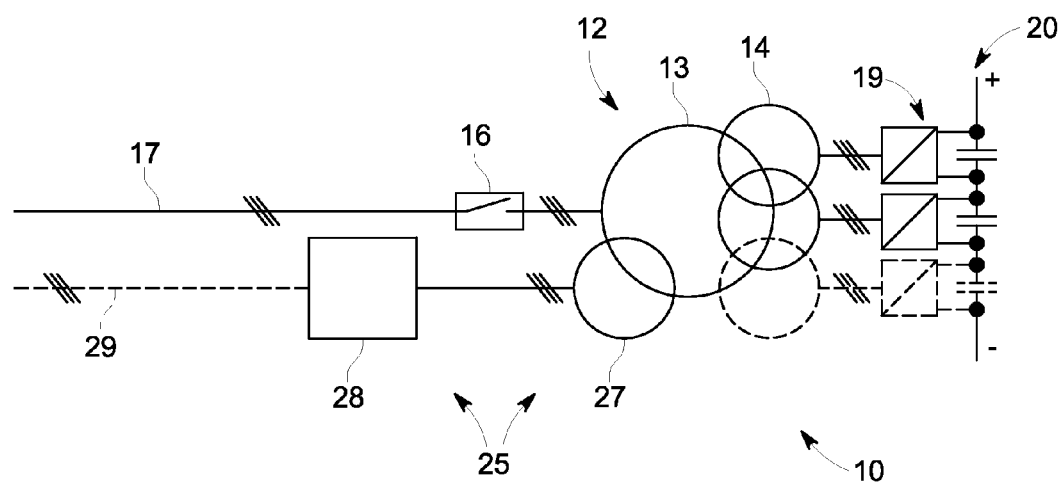
FIG. 1 shows a systematic block diagram of an application example of an electrical circuit according to an embodiment of the invention.

FIG. 1 depicts an electrical circuit 10 which includes a transformer 12 with at least one primary winding 13 and at least one magnetically coupled secondary winding 14. The primary winding 13 is connected to an electric power grid 17 using a switch 16. Each of the secondary windings 14 are connected to at least one accompanying power converter 19 with at least one capacitor 20 of a direct current link. The capacitors 20 allocated to the power converters 19 are connected in series and form the plus and minus terminals of the direct current link.

Each of the power converters 19 is provided for the conversion of a direct current applied to the associated capacitor 20 into an alternating current voltage applied to the accompanying secondary winding 14 and vice versa. Each of the power converters 19 with the accompanying capacitor 20 can, for example, be part of an electric converter used for feeding electrical energy into the electric power grid. In particular, the transformer 12 can be used with the power converter(s) 19 and the capacitor(s) 20 as part of a co-current flow system for the coupling of alternating current voltage networks. The converter can, for instance, be a multi-level, so-called NSP (neutral point clamped) converter.

However, it is expressly noted that the converter and therefore also the power converter(s) 19 and/or the capacitor(s) 20 can also be designed and connected in alternative ways. Specifically, the direct current link can also be integrated into the power converters 19 and would therefore not be available as the power converter 19 downstream from the capacitor 20 as is shown in FIG. 1.

For the sake of simplicity, reference will only be made to one single power converter 19 and one single capacitor 20 in the following.

A circuit arrangement 25 is connected to the electrical circuit 10 described above.

The circuit arrangement 25 comprises at least one auxiliary winding 27, which is magnetically coupled to the primary winding 13 of the transformer 12. Furthermore, the circuit arrangement 25 includes at least one switching device 28, which is connected to the auxiliary winding 27. The switching device 28 may consist of one or more electrical switches. Essentially, in an embodiment, the circuit arrangement 25 must include the auxiliary winding 27 and the switching device 28, and can also feature other electrical components, although these are not necessarily required.

In a first case, the switching device 28 of the circuit arrangement 25 is only connected to the auxiliary winding 27. Furthermore, the switching device 28 is designed in such a way that it can only short-circuit the phases of the auxiliary winding 27. The term "only" simply expresses that the intended function in the second case explained below is not available in the first case. However, it is understood that other functions may be available in addition to the one in this first case, so that the term "only" is not limiting to this extent.

The aforementioned short-circuiting can, for instance, be realized with the help of thyristor pairs positioned antiparallel between the phases of the auxiliary winding 27. In this way, by means of the switching device 27, a so-called short-circuiting function can be realized for the power converter 19. If the thyristors are triggered, this will result in a short circuit between the phases of the auxiliary winding 17. In this way, the power converter 19 can be protected in the event of malfunction.

In a second case, the switching device 28 of the circuit arrangement 25 is connected to the auxiliary winding 27 and an auxiliary supply 29. Furthermore, the switching device 28 is formed in such a way that it can only connect the phases of the auxiliary winding 27 with the associated phases of the auxiliary voltage 29. The term "only" simply expresses that the intended function in the first case explained above is not available in the second case. However, it is understood that other functions may be available in addition to the function in this second case, so that the term "only" is not limiting to this extent.

The aforementioned connection of the phases can, for example, be realized with the aid of anti-parallel switched thyristor pairs which are mutually connected in parallel. In this way, a so-called pre-charging and charging function can be realized with the switching device 28 for the capacitor 20. If the thyristors are triggered, the capacitor 20 will be charged by the transformer 12 and the power converter 19. As a result, pre-charging of the capacitor 20 is in particular possible when operating the power converter 19.

In a third case, the switching device 28 of the circuit arrangement 25 is connected to the auxiliary winding 27 and an auxiliary supply 29. In contrast to the second case, the switching device 28 is designed in the third case in such a way that it cannot only perform the pre-charging function but also the circuit-closing function of the first case. This can be achieved with the aid of thyristor pairs and additional electrical switches.

Figure 2:
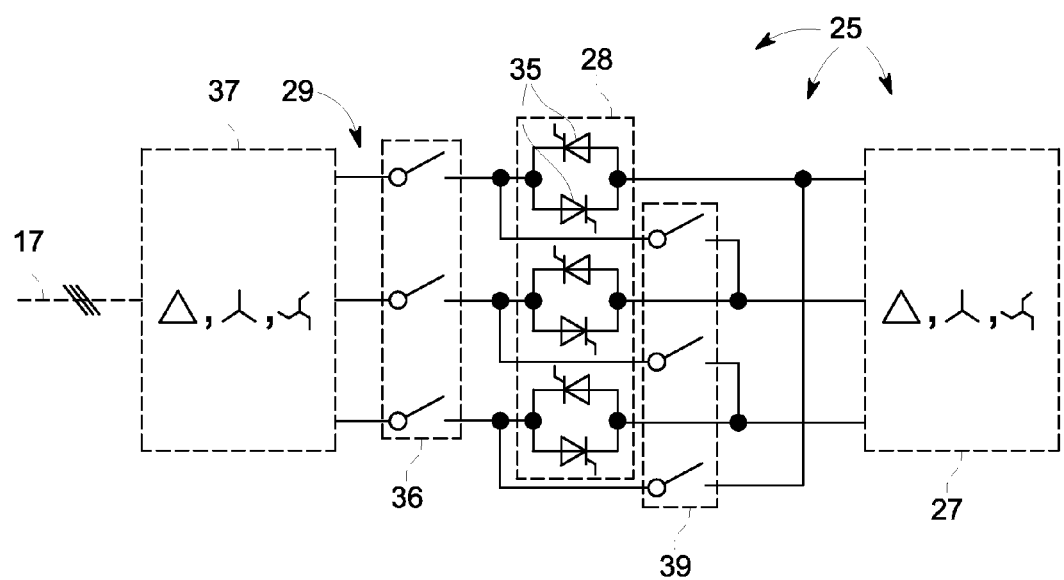
FIG. 2 shows a systematic block diagram of an application example of part of the circuit in FIG. 1 according to an embodiment of the invention.

The third case mentioned above is described in more detail below on the basis of FIG. 2. FIG. 2 shows the circuit arrangement 25 for this third case. In contrast to the first and second case, the circuit arrangement 25 in the third case not only includes the auxiliary winding 27 and the switching device 28, but also other electrical components. However, it is expressly pointed out that FIG. 2 illustrates only one exemplary possibility, as to how the circuit arrangement 25 can be realized in this third case.

In the circuit arrangement 25 in FIG. 2, the auxiliary winding 27 is shown as a three-phase design and can be a star, delta or zigzag winding. The three phases of the auxiliary winding 27 are connected to the switching device 28, each with two anti-parallel connected thyristors 35. The three pairs of anti-parallel connected thyristors 35 in the switching device 28 are each connected via a controllable switch 36, either directly with the auxiliary supply 29 or, if applicable, with an additional transformer 37.

If the transformer 37 is available, as shown in FIG. 2 as an example, the transformer 37 can in particular be connected to the electric power grid on the opposite side to the switches 36, so that the auxiliary supply 29 is on the side of the transformer 37 opposite to the switches 36 in this case and can be set to any desired value with the aid of the transformer 37. The transformer 37 can be designed as a star, delta or zigzag winding. If appropriate, the switches 36 can be omitted. In this case, however, the downstream electrical components, that is, in particular the transformer 37, need to be able to withstand the short-circuiting of the phases without damage.

Three controllable switches 39 are also available. The first switch 39 is, on the one hand, connected to the connection point of the thyristor pair and the switch 36 to the upper phase of FIG. 2 and, on the other hand, to the connection point of the thyristor pair and the auxiliary winding 27 of the middle phase of FIG. 2. The second switch 39 is connected in a corresponding way between the middle and the lower phase of FIG. 2 and the third switch 39 between the lower and the upper phase of FIG. 2. Each of the switches 39 are therefore connected so that they connect a thyristor pair with another of the phases in its closed, i.e. so-conducting state. Reference is also made to the circuitry as shown in FIG. 2.

For realizing a short-circuiting function, the switches 36 are opened, i.e. switched to a non-conducting state, and the switches 39 are shut, i.e. switched to a conducting state. The switch 16 is closed, i.e. conducting. The thyristors 35 are not triggered. The transformer 37 and the auxiliary supply 29 are therefore separated from the transformer 12 due to the opened switch 36. Due to the closed switch 39, each of the three pairs of thyristors 35 is switched between two different phases of auxiliary winding 17. The thyristors 35 of the switching device 28 are, as mentioned, not triggered.

In this state, the electrical circuit 10 can operate normally as intended. Specifically, the power converter 19 can convert transferred alternating current into a direct current supplied to the capacitor 20 or vice versa, via the primary and secondary winding 13, 14 of the transformer 12.

If a fault now occurs, for instance if a short-circuit occurs for any reason between the plus and minus terminals of the direct current link, the thyristors 35 of the switching device 28 will be triggered, for instance after an established current limit value has been exceeded, in order to reduce the burden on the power semiconductor components contained in the power converters 19. Triggering the thyristors 35 causes the phases of the auxiliary winding 27 of the transformer 12 to short-circuit each other. As a further consequence, the phases of the electric power grid 17 will also be short-circuited via the primary winding 13 of the transformer 12. This can avoid or reduce any further charging of the capacitor 20 from the electric power grid 17 and consequently the stress on the power semiconductor components of the power converter. This represents a protective function for the power converter 19 and/or the capacitor 20.

To perform a pre-charging function, the switches 36 are shut, i.e. switched to a conducting state and the switches 39 are opened, i.e. switched to a non-conducting state. The switch 16 is opened, i.e. non-conductive. The thyristors 35 are triggered.

In this state, the electrical circuit 10 can perform a pre-charging or charging function. In particular, the capacitor 20 can be charged from the auxiliary supply 29 via the auxiliary, primary and secondary windings 27, 13, 14 of the transformer 12 and via the power converter 19.

If the desired voltage has been achieved in the capacitor, the pre-charging function can be completed and the circuit arrangement 25 can be changed to the setup described above for normal operation.

It is understood that the short-circuiting function and the pre-charging function cannot be performed simultaneously, only alternatively.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A circuit arrangement for connection to an electrical circuit, wherein the electrical circuit comprises a transformer comprising at least one primary winding connected to an electric power grid and at least one secondary winding connected to a power converter with a capacitor, the circuit arrangement comprising:
   an auxiliary winding coupled to the at least one primary winding; and
   a switching device coupled to the auxiliary winding, the switching device including:
   a first anti-parallel connected thyristor pair coupled to a first phase of the auxiliary winding, a second anti-parallel connected thyristor pair coupled to a second phase of the auxiliary winding, and a third anti-parallel connected thyristor pair coupled to a third phase of the auxiliary winding; and a first switch connected to the first anti-parallel connected thyristor pair, a second switch connected to the second anti-parallel connected thyristor pair, and a third switch connected to the third anti-parallel connected thyristor pair; and
   a fourth switch connecting a connection point of the first switch and the first anti-parallel connected thyristor pair to a connection point of the second anti-parallel connected thyristor pair and the second phase of the auxiliary winding;
   a fifth switch connecting a connection point of the second switch and the second anti-parallel connected thyristor pair to a connection point of the third anti-parallel connected thyristor pair and the third phase of the auxiliary winding; and
   a sixth switch connecting a connection point of the third switch and the third anti-parallel connected thyristor pair to a connection point the first anti-parallel connected thyristor pair and the first phase of the auxiliary winding.

2. The circuit arrangement according to claim 1, wherein the switching device is configured to short-circuit the phases of the auxiliary winding.

3. The circuit arrangement according to claim 1, wherein the switching device is configured to charge the capacitor.

4. The circuit arrangement according to claim 1, wherein the switching device is configured to short-circuit the phases of the auxiliary winding or to charge the capacitor.

5. The circuit arrangement according to claim 1, wherein when the at least two anti-parallel connected thyristors are triggered, the auxiliary winding is connected to an auxiliary supply.

6. The circuit arrangement according to claim 1, further comprising at least one second switch connected to the switching device, wherein when the at least one second switch is in closed state, one of the phases of the auxiliary winding short-circuits with another one of the phases of the auxiliary winding.

7. The circuit arrangement according to claim 1, wherein the switching device is connected to an auxiliary supply.

8. The circuit arrangement according to claim 7, wherein the auxiliary supply is connected to an additional transformer and to the electric power grid through the additional transformer.

9. The circuit arrangement according to claim 1, wherein the power converter and/or the capacitor is part of the electric energy converter.

10. An electrical circuit comprising:
    a transformer comprising at least one primary winding connected to an electric power grid and at least one secondary winding connected to a power converter with a capacitor; and
    a circuit arrangement connected to the electrical circuit, the circuit arrangement comprising;
    an auxiliary winding coupled to the at least one primary winding; and
    a switching device coupled to the auxiliary winding, the switching device including:
    a first anti-parallel connected thyristor pair coupled to a first phase of the auxiliary winding, a second anti-parallel connected thyristor pair coupled to a second phase of the auxiliary winding, and a third anti-parallel connected thyristor pair coupled to a third phase of the auxiliary winding;
    a first switch connected to the first anti-parallel connected thyristor pair, a second switch connected to the second anti-parallel connected thyristor pair, and a third switch connected to the second third anti-parallel connected thyristor pair;
    a fourth switch connecting a connection point of the first switch and the first anti-parallel connected thyristor pair to a connection point of the second anti-parallel connected thyristor pair and the second phase of the auxiliary winding;

a fifth switch connecting a connection point of the second switch and the second anti-parallel connected thyristor pair to a connection point of the third anti-parallel connected thyristor pair and the third phase of the auxiliary winding; and a sixth switch connecting a connection point of the third switch and the third anti-parallel connected thyristor pair to a connection point of the first anti-parallel connected thyristor pair and the first phase of the auxiliary winding.

11. The electrical circuit according to claim 10, wherein the switching device is configured to short-circuit the phases of the auxiliary winding.

12. The electrical circuit according to claim 10, wherein the switching device is configured to charge the capacitor.

13. The electrical circuit according to claim 11, wherein the switching device is configured to short-circuit the phases of the auxiliary winding or to charge the capacitor.

14. The circuit arrangement according to claim 10, wherein when the at least two anti-parallel connected thyristors are triggered, the auxiliary winding is connected to an auxiliary supply.

15. The electrical circuit according to claim 10, wherein the circuit arrangement further comprises at least one second switch connected to the switching device, wherein when the at least one second switch is in closed state, one of the phases of the auxiliary winding short-circuits with another one of the phases of the auxiliary winding.

16. The electrical circuit according to claim 10, wherein the switching device is connected to an auxiliary supply.

17. The electrical circuit according to claim 16, wherein the auxiliary supply is connected to an additional transformer and to the electric power grid through the additional transformer.

18. The electrical circuit according to claim 10, wherein the power converter and/or the capacitor is part of the electric energy converter.

* * * * *